(12) United States Patent
Aufrance (10) Patent No.: US 6,234,500 B1
(45) Date of Patent: May 22, 2001

(54) PNEUMATIC DEVICE FOR ADJUSTING WHEEL CAMBER

(76) Inventor: Steven E. Aufrance, 2019 21st St. NE., Canton, OH (US) 44705

( * ) Notice: Subject to any disclaimer, the term of this patent is extended or adjusted under 35 U.S.C. 154(b) by 0 days.

(21) Appl. No.: 09/183,477

(22) Filed: Oct. 30, 1998

Related U.S. Application Data (60) Provisional application No. 60/063,776, filed on Oct. 31, 1997.

(51) Int. Cl.$^7$ ....................................................... B60G 7/02
(52) U.S. Cl. ....................................................... 280/86.751
(58) Field of Search ......................................... 280/86.751

(56) References Cited

U.S. PATENT DOCUMENTS

| | | | |
|---|---|---|---|
| 4,644,597 | * | 2/1987 | Walker ...................................... 5/711 |
| 5,117,373 | * | 5/1992 | Huff ...................................... 702/173 |
| 5,427,331 | * | 6/1995 | Stroud ........................... 244/122 AG |
| 5,975,568 | * | 11/1999 | Speckhart et al. .................... 280/735 |

* cited by examiner

Primary Examiner—Paul N. Dickson
Assistant Examiner—Faye M. Fleming
(74) Attorney, Agent, or Firm—Sand & Sebolt

(57) ABSTRACT

A pneumatic device for adjusting wheel camber includes an air bladder operatively connected with an air supply valve and an air release button via an air hose. The device facilitates adjustment of vehicle wheel camber and is adapted to be connected with a compressed air supply. The air supply valve and air release button control the delivery and release of compressed air into and from the air bladder. The air bladder is placed between the strut and the tire-wheel assembly of a vehicle, and the camber adjustment bolts are loosened. The air bladder is then selectively inflated, thus compressively moving the tire-wheel assembly in relation to the strut, until the correct camber setting is achieved. The camber adjustment bolts are then tightened, the compressed air contained in the air bladder is released therefrom, and the device is removed from the vehicle.

29 Claims, 6 Drawing Sheets

PNEUMATIC DEVICE FOR ADJUSTING WHEEL CAMBER

CROSS REFERENCE TO RELATED APPLICATION

This application claims priority from U.S. Provisional Application No. 60/063,776, filed Oct. 31, 1997, the disclosures of which are incorporated herein by reference.

BACKGROUND OF THE INVENTION

1. Technical Field

The invention relates generally to an improved tool. More particularly, the invention relates to an improved tool and method for the adjustment of wheel camber. Specifically, the invention relates to a tool which pneumatically moves a vehicle wheel in a precise fashion so that its camber can be adjusted by a single person.

2. Background Information

The term "camber" refers to the angle between a vehicle wheel and the vertical axis. Proper adjustment of the camber angle is essential to maintain vehicle stability and performance, and assures proper tread wear and tread life.

Motor vehicles require periodic adjustment of their wheel camber, due to a number of factors including tire wear and replacement, strut wear and replacement, and road hazards, among others. With the generally increasing durability of automobiles, a given vehicle will require numerous camber adjustment over the course of its usable lifetime.

On many vehicles, proper camber is maintained by a number of bolts which extend through two flanges, one of which is attached to the overhead strut, and the other of which is connected to the spindle upon which the wheel is mounted. When these bolts are tightened, a compression load is created between the two flanges, causing the flanges to be frictionally held together, maintaining the proper orientation between the strut and the wheel, which in turn maintains the wheel camber.

To adjust the wheel camber, the vehicle must first be positioned such that the wheels fully support the weight of the vehicle without the use of jacks or lifts to reduce the weight borne by the wheels. The bolts must then be loosened and the wheel moved in relation to the overhead strut until the correct camber setting is achieved. Another specially-designed tool known in the art moved the wheel by means of a specially designed screw-driven tool which caused two members to expand in the space between the wheel and the overhead strut, applying a load inwardly against the strut and outwardly against the wheel, with the result that the wheel would move in relation to the fixed strut. The screw drive on the specially-designed tool would be adjusted until the correct camber setting was achieved, and the bolts would then be tightened to maintain the correct camber setting.

Since the adjustment of camber must occur while the vehicle weight is supported by the wheels, movement of the wheel requires that a significant amount of force be applied by the specially-designed tool to both the strut and the wheel. Since the specially-designed tool must fit through the small space between the top of the vehicle tire and the lower edge of the vehicle fender, the tool must necessarily be of a very low profile. Since the specially-designed tool must apply a significant force to the strut, yet be designed with low profile, the force is applied by the tool to a very small area of surface on the strut, causing a high level of bearing stress at the point of force application. This bearing stress may result in plastic deformation or damage to the strut.

Moreover, since an angle exists between the strut and the plane of the wheel, and the load is applied inside this angle by the specially-designed tool to the strut and the wheel, the resultant force applied to the strut must include both a compressive component normal to the strut surface and a frictional component parallel to the surface. Depending upon the relative magnitudes of these compressive and frictional forces, which in turn depends upon the angle between the strut and the plane of the wheel, the tool may be caused to slip from the strut if the angle becomes too great or if the tool is misapplied or accidentally bumped by the mechanic. Such a slip can result both in damage to the vehicle and injury to the user or others nearby.

Additionally, since the screw adjustment means of the specially-designed tool is a fixed component of the tool, any adjustment of the screw drive must be performed at the location where the tool is applied to the wheel, which will typically be immediately outside the wheel opening of the vehicle fender. Since computers are often used in the modern automotive workshops of today, a mechanic utilizing such a computer in concert with the specially-designed tool will typically be required to walk back and forth between the tool and the computer.

Alternatively, wheel camber can be adjusted without the use of the specially-designed tool by utilizing shop personnel to adjust wheel camber. More particularly, the bolts are loosened, and the wheel is manually moved to the correct camber position while a second person operates the computer and tightens the bolts as the wheel is held in position. While this system is functional, it is difficult to do accurately, and requires the use of two people, rather than one, significantly increasing the cost of adjusting wheel camber.

Therefore, the need exists for low cost, portable mechanism which allows the user to quickly adjust and hold the position of a vehicle tire for adjustment of its camber, while reducing the time wasted by the user in walking between the means of adjustment and a computer, and while reducing the risk of damage to the vehicle components and injury to the user.

SUMMARY OF THE INVENTION

Objectives of the invention include providing an improved device for changing the orientation of a vehicle wheel so that its camber setting can quickly be adjusted by a single individual.

Another objective includes providing a device which can change the orientation of a vehicle wheel without creating a high level of bearing stress on the vehicle suspension components.

Still another objective includes providing a device which can be quickly installed and operated by the user.

Yet another objective includes providing a device which can change the orientation of a vehicle wheel and in so doing will reduce the risk of damage to the vehicle or to the user from slippage of the device resulting from improper installation or accidental bumping by the user.

A still further objective includes providing a device which can change the orientation of a vehicle wheel while minimizing the amount of time wasted by the user in walking back and forth between the device and any computer which is employed in the camber adjustment process.

A further objective includes providing a device for changing the orientation of a vehicle wheel which is inexpensive to manufacture and maintain, and requires no additional support equipment or environment beyond that which would ordinarily be found in its typical place of use.

These and other objectives and advantages of the improved invention are obtained from the pneumatic device for adjusting wheel camber, the general nature of which can be stated as including an expansion member, the expansion member expanding in response to fluid supplied from the fluid source, the expansion member fabricated from a durable material capable of withstanding the forces required for adjusting vehicle wheel camber.

BRIEF DESCRIPTION OF THE DRAWINGS

The preferred embodiments of the invention, illustrative of the best mode in which applicant has contemplated applying the principles of the invention, are set forth in the following description and is shown in the drawings and are particularly and distinctly pointed out and set forth in the appended Claims.

Similar numerals refer to similar parts throughout the specification.

DESCRIPTION OF THE PREFERRED EMBODIMENTS

Figure 1:
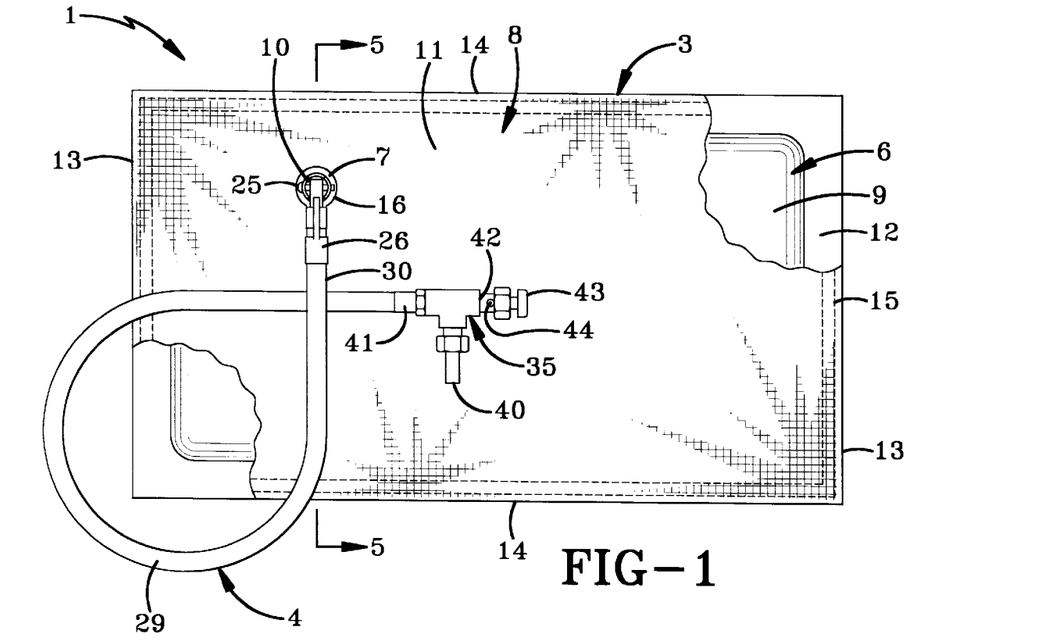
FIG. 1 is the front view of the invention and generally shows the invention with attached air hose connector and air hose.
Figure 2:
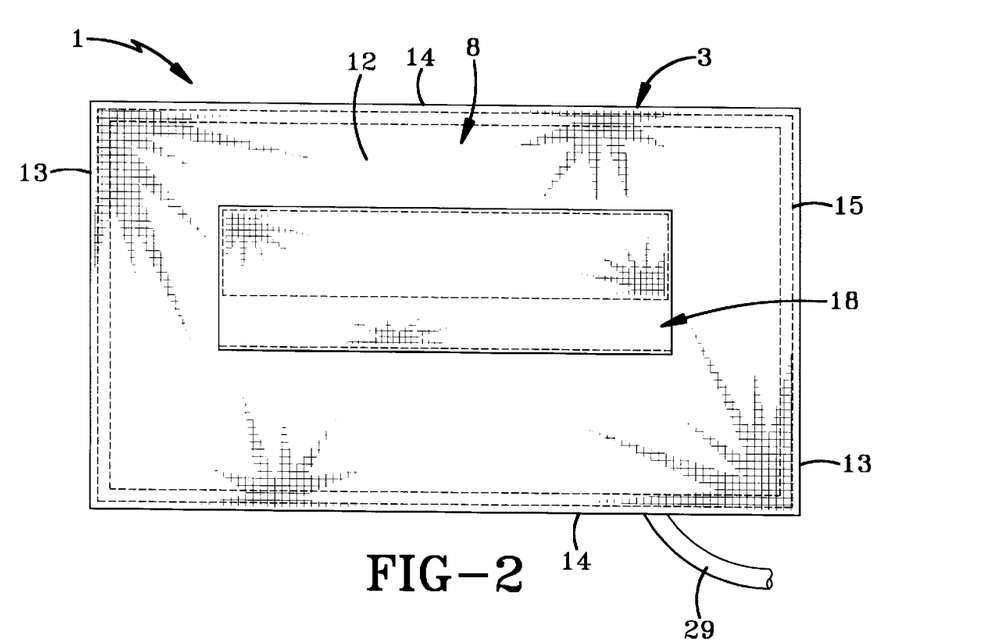
FIG. 2 is the rear view of the invention and shows generally the rear flap which conceals the opening through which access is gained to remove and replace the inner bladder.
Figure 3:
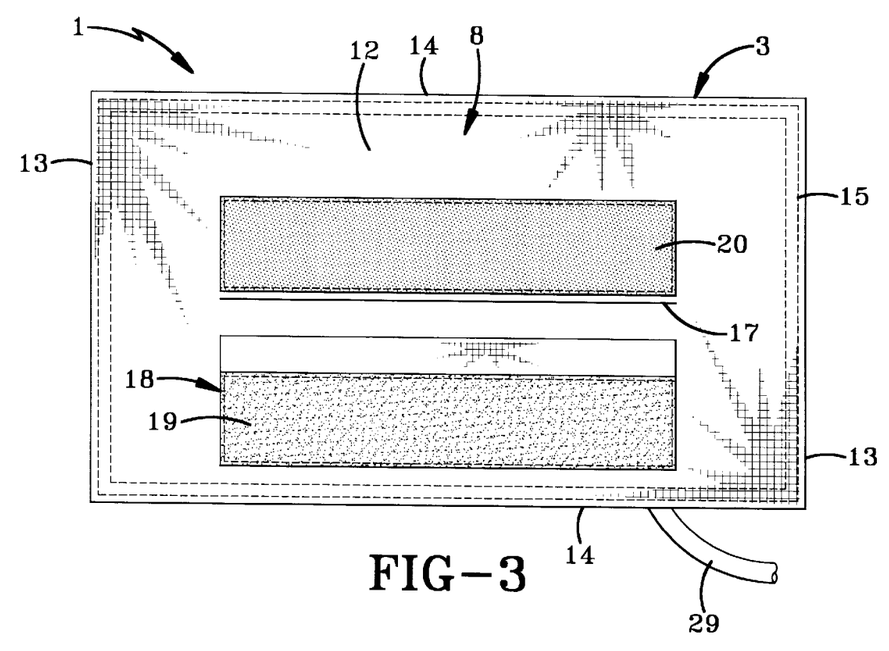
FIG. 3 is a rear view of the invention showing the rear flap in the open position.
Figure 4:
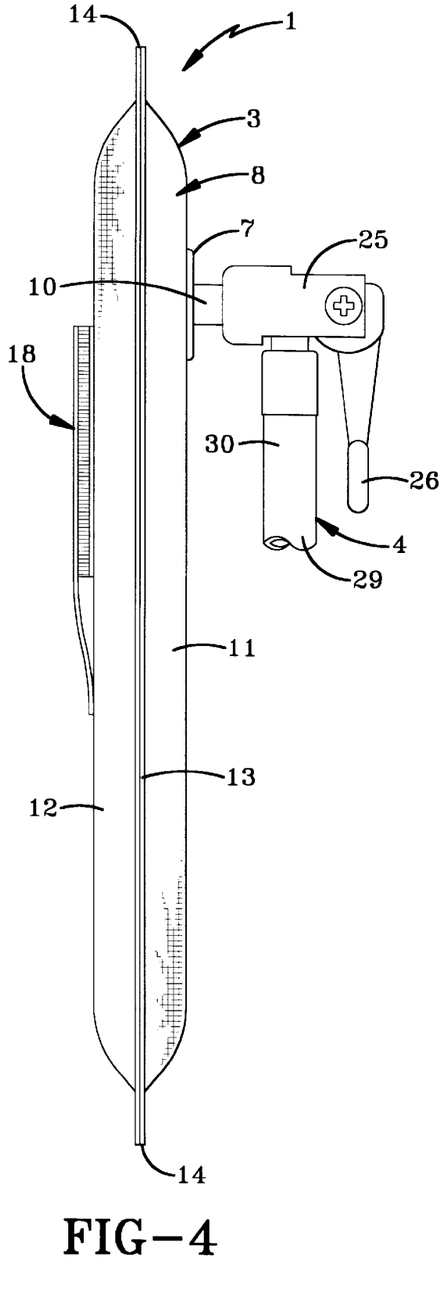
FIG. 4 is a side elevational view of the invention shown in FIG. 1.

The improved pneumatic camber adjusting device of the present invention is indicated generally at the numeral 1, and is shown particularly in FIGS. 1–3. Pneumatic camber adjusting device 1 includes an air bladder 3 and an air hose assembly 4 attached to air bladder 3.

Air bladder 3 includes an inner bladder 6 and an outer covering 8 which circumferentially envelops inner bladder 6. Inner bladder 6 includes a substantially rectangular elastic body 9 and an air inlet port 10 attached to elastic body 9. Inner bladder 6 is preferably manufactured of a resilient elastic material such as rubber in order to permit elastic body 9 to expand and contract for purposes which will be set out in more detail hereinbelow. While elastic body 9 is preferably manufactured of rubber, it may be manufactured of any one of a variety of materials which provide sufficient resilient characteristics without departing from the spirit of the present invention.

Outer covering 8 is rectangular in configuration and preferably includes an upper face 11 and a lower face 12, each formed with a pair of parallel and spaced apart sides 13 and a pair of parallel and spaced apart ends 14 perpendicular to sides 13. Sides 13 and ends 14 of faces 11 and 12 are then attached to one another by heat welding or stitching 15. Again, other methods of attachment may be utilized for attaching upper face 11 to lower face 12 around its perimeter edge without departing from the spirit of the present invention. Upper face 11 is formed with a hole 16 for receiving air inlet port 10 of inner bladder 6. Additionally, a brass grommet 7 extends into hole 16 to strengthen the same and is suitably sized to allow air inlet port 10 to pass therethrough.

Additionally, in referring specifically to FIG. 2, lower face 12 is formed with an elongated opening 17 to permit the insertion of inner bladder 6. Closure flap 18 is attached to lower face 12 on one side of access opening 17. Closure flap 18 is formed with a plurality of loop fasteners 19 attached thereto. Similarly, a plurality of hook fasteners 20 are attached directly to lower face 12 on the opposite side of access opening 17 such that when closure flap 18 is moved from the open position shown in FIG. 3 to the closed position shown in FIG. 2, loop fasteners 19 attach to hook fasteners 20 to close over access opening 17 and prevent the removal of inner bladder 6.

Outer covering 8 is somewhat larger to permit inner bladder 6 to expand when air is introduced thereto through air inlet port 10. While in a preferred embodiment, outer covering 8 and inner bladder 6 are separate components, the invention could be included as a one piece construction whereby outer covering 8 and inner bladder 6 are integrally connected, without departing from the spirit of the present invention.

Figure 5:
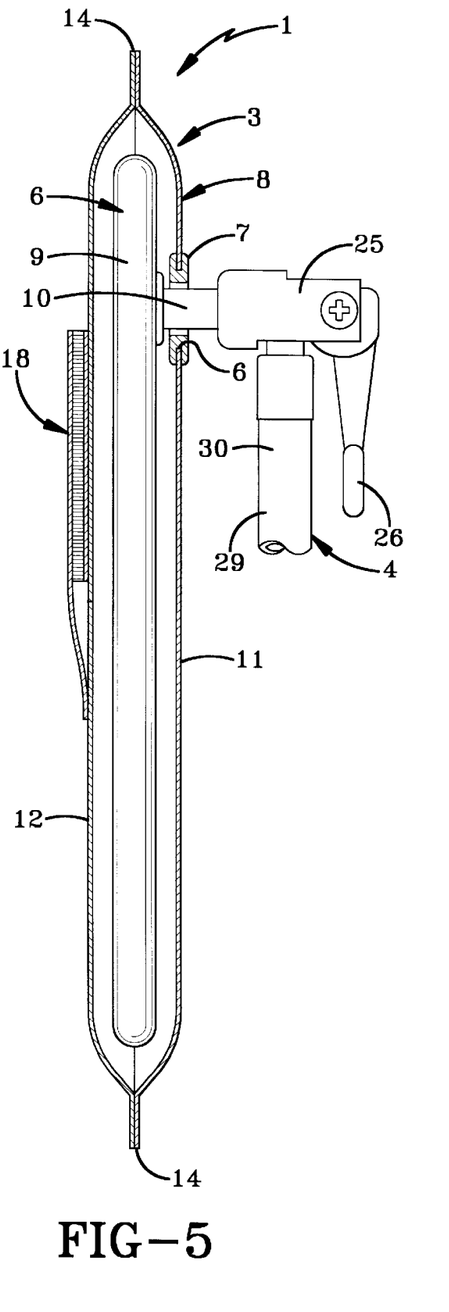
FIG. 5 is a sectional view of the invention taken along line 5—5 of FIG. 1.

In accordance with one of the main features of the present invention, and referring more particularly to FIG. 5, and as discussed hereinabove, inner bladder 6 is a thin walled airtight enclosure manufactured of a resilient elastic material. Air inlet port 10 is attached to inner bladder 6 such that air can flow through air inlet port 10 and into inner bladder 6 without obstruction. In the preferred embodiment, air inlet port 10 is a commercially available valve stem containing a valve having a spring loaded button which, when depressed, opens a passage through which air can flow into inner bladder 6. An air hose connector 25, attaches to air inlet port 10 by operation of a lever 26 which causes force to be applied radially inwardly against inlet port 10 forming an airtight seal. Operation of lever 26 removably attaches air hose connector 25 to air inlet port 10 and simultaneously depresses the spring loaded button contained within the valve. Air hose connector 25 is attached to a compressed air source 28 through a hose 29. Air is thus permitted to pass from compressed air source 28 through hose 29 into air hose connector 25 through air inlet port 10 and into inner bladder 6 thereby causing inner bladder 6 to expand from the position shown in FIG. 6 to the position shown in FIG. 7.

Air hose 29 includes a first end 30 attached to air hose connector 25 as discussed hereinabove and a second end 31 attached to compressed air source 28. Intermediate first end 30 and second end 31 is a lever operated air supply valve 32. When lever operated air supply valve 32 is operated by depressing an attached lever 33, air is permitted to pass from compressed air source 28 through hose 29 and into air bladder 3.

Figure 7:
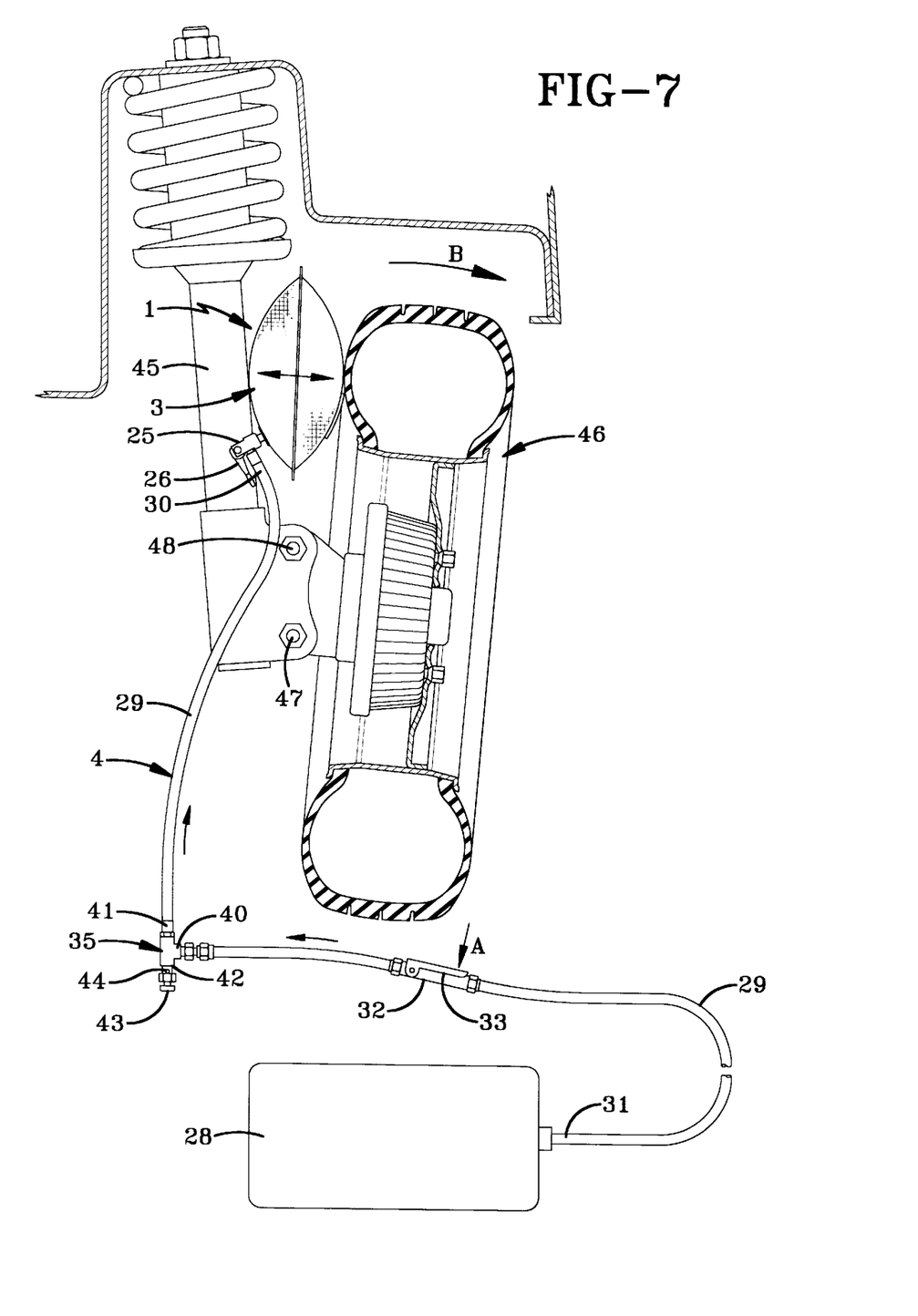
FIG. 7 is an elevational view similar to FIG. 6 but with the air bladder of the present invention shown in a second inflated condition.
Figure 8:
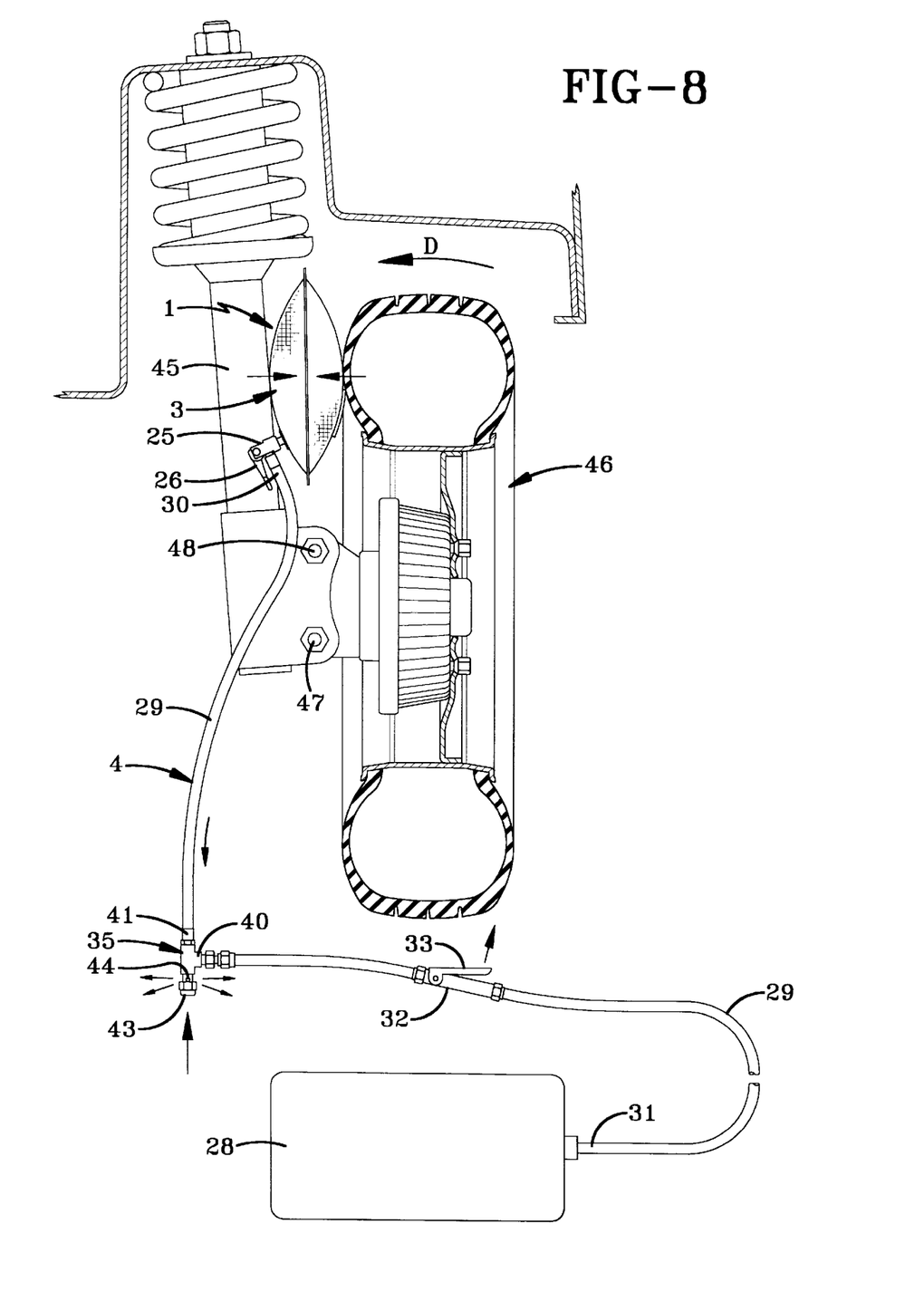
FIG. 8 is an elevational view similar to FIG. 7 shown with the air bladder in a partially deflated condition.

In accordance with another feature of the present invention, a three-way threaded block 35 is positioned intermediate air supply valve 32 and first end 30. More particularly, three-way threaded block 35 includes a first aperture 40 which is connected to air supply valve 32 via air hose 29 and a second aperture 41 which is attached to air hose connector 25 via air hose 29. Additionally, three-way block 35 also provides a third aperture 42 for receiving a spring loaded air release button 43 formed with a plurality of holes 44 therein. When spring loaded air release button 43 is in the relaxed position such as shown in FIG. 7, air passes directly from air supply valve 32 through first aperture 40 and second aperture 41 and into air hose connector 25. However, if air release button 43 is depressed such as shown in FIG. 8, air travels out of inner bladder 6 through hose 29 and out of holes 44 as is described in more detail hereinbelow.

Figure 6:
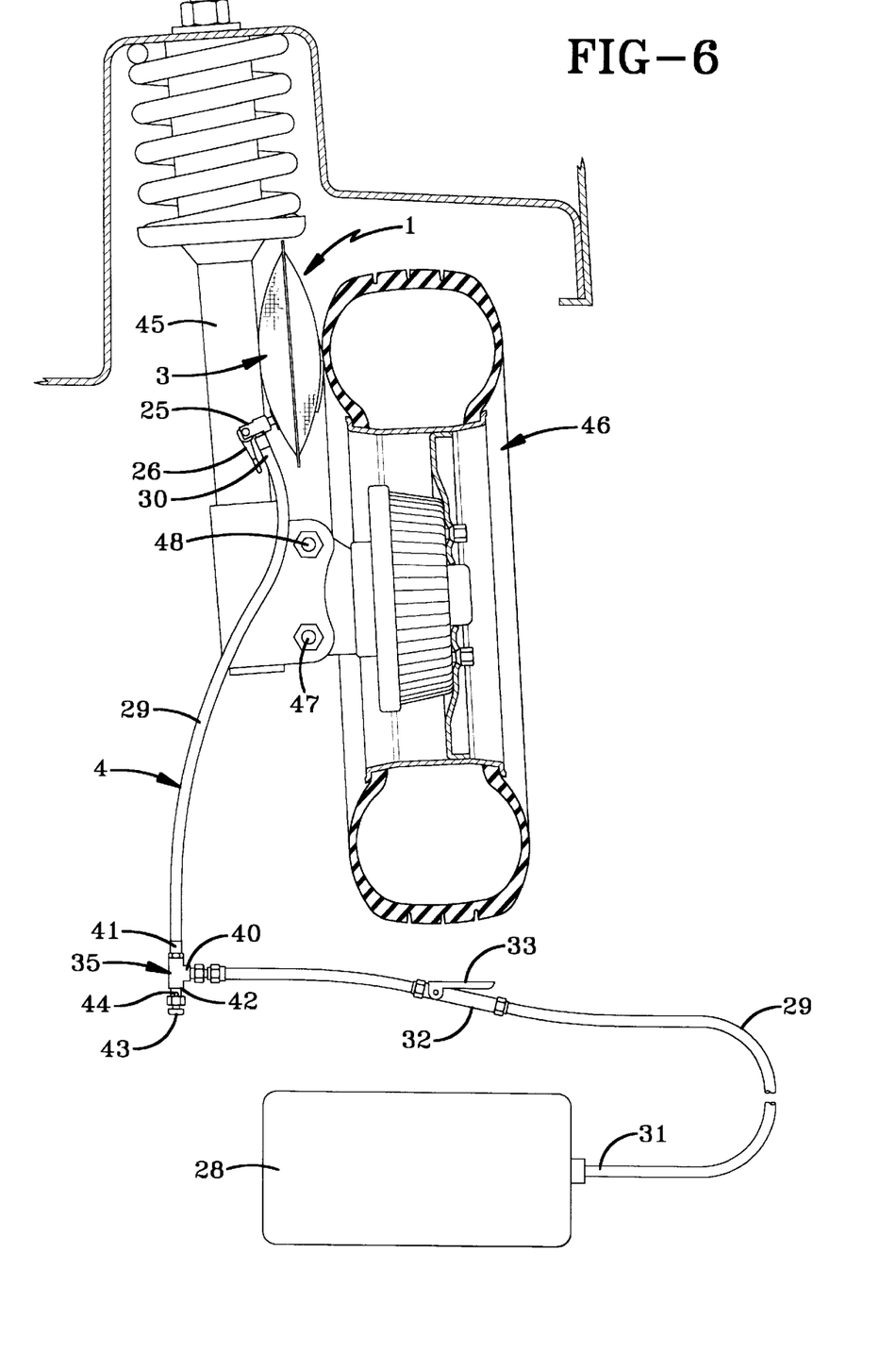
FIG. 6 is an elevational view of an automobile with portions broken away in section and showing the invention attached to a compressed air supply system.

Referring particularly to FIG. 6, air bladder 3 is positioned intermediate strut 45 and tire wheel assembly 46. Tire wheel assembly 46 is attached to strut 45 via a lower bolt 47 and an upper bolt 48. When air bladder 3 is positioned between strut 45 and tire wheel assembly 46, it is attached via an air hose 29 to compressed air source 28 as described hereinabove.

In operation, air bladder 3 is positioned in the space between strut 45 and tire wheel assembly 46. Lower bolt 47 and upper bolt 48 are then loosened to allow pivoting motion of tire wheel assembly 46 about upper bolt 48. When air bladder 3 of pneumatic wheel camber adjusting device 1 is appropriately positioned, lever 33 of air supply valve 32 is depressed as indicated by arrow A in FIG. 7. Air then travels through hose 29 into air hose connector 25 through air inlet port 10 and into inner bladder 6 such that inner bladder 6 expands and moves tire wheel assembly 46 in the direction of arrow B. After inner bladder 6 is expanded to the position shown in FIG. 7, lever 33 of air supply valve 32 is released. Air release button 43 is mounted in three-way block 35 is then depressed to permit air to travel back out of inner bladder 6 through hose 29 and through exit holes 44 adjacent air release button 43. As air release button 43 is depressed, air will exit inner bladder 6 allowing tire wheel assembly 46 to move in the direction of arrow D and compress inner bladder 6. Once the technician has located the correct camber for tire wheel assembly 46 by releasing air from inner bladder 6 and allowing air bladder 3 to collapse, air release button 43 is released such that the air remaining within inner bladder 6 is retained therein and the position of tire wheel assembly 46 is accurately maintained. Thereafter, both lower bolt 47 and upper bolt 48 are tightened, and the remaining air is released from inner bladder 6 via the activation of air release button 43 and the unit is removed from intermediate strut 45 and tire wheel assembly 46. It should be understood that the insertion of air into inner bladder 6 via air supply valve 32 and the release of air from inner bladder 6 via the operation of air release button 43 mounted within three-way block 35 may be automated without departing from the spirit of the present invention. Additionally, three-way block 35 or inner bladder 6 may include a pressure release mechanism which prevents inner bladder 6 from being over inflated via the operation of air supply valve 32 such that, when the pressure within inner bladder 6 reaches a predetermined level, air is released to reduce the pressure and prevent damage to air bladder 3.

Figure 9:
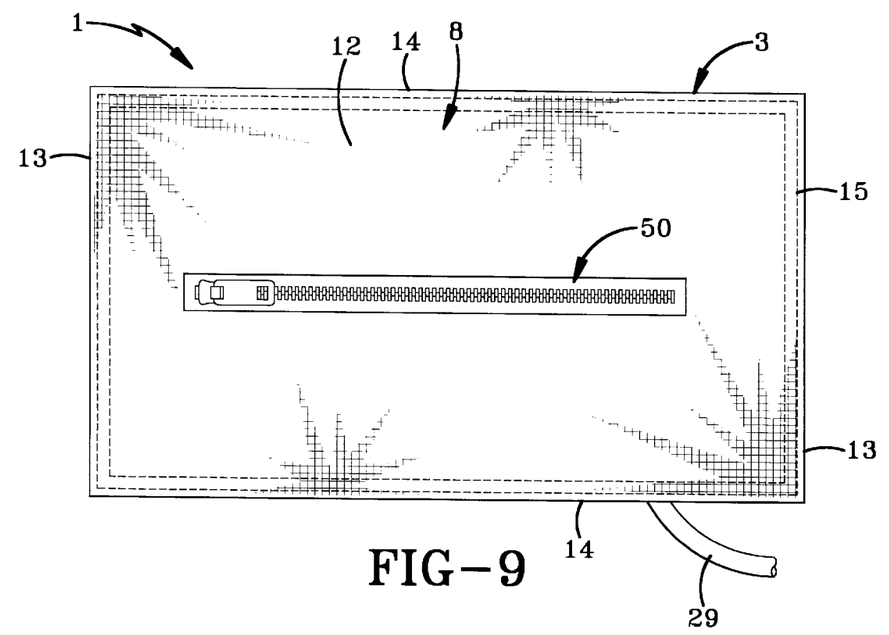
FIG. 9 is a rear view of a second embodiment of the present invention.

A second embodiment of the present invention is disclosed wherein closure flap 18 and hook and loop fasteners 19 and 20 are replaced by a single zipper 50 shown more particularly in FIG. 9. Zipper 50 is attached to lower face 12 and may be moved between an open and a closed position to allow for ingress and egress of inner bladder 6.

Accordingly, the improved pneumatic wheel camber adjusting device provides a tool which accurately operates to position the wheel to set correct camber, and which permits the operator to operate the wheel camber adjusting device from a remote location adjacent the computer such that the operator need not move continually between the wheel and the computer utilized for setting wheel camber.

Accordingly, the improved pneumatic device for adjusting wheel camber is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved pneumatic device for adjusting wheel camber is constructed and used, the characteristics of the construction, and the advantageous, new and useful results obtained; the new and useful structures, devices, elements, arrangements, parts and combinations, are set forth in the appended Claims.

I claim:

1. A tool for adjusting camber of a vehicle wheel adjacent a strut when used with a source of pressurized fluid, said tool comprising:

an expansion member, said expansion member positionable between said vehicle wheel and said strut adapted to expand when fluid is supplied to said expansion member from the source of pressurized fluid; and said expansion member fabricated from a durable material capable of holding fluid pressurized to a degree whereby the camber of the vehicle wheel may be adjusted by selectively pressurizing the expansion member with fluid from said source of pressurized fluid.

2. The tool as set forth in claim 1 further comprising a fluid supply valve operatively connected with said expansion member.

3. The tool as set forth in claim 2 further comprising a fluid release valve operatively connected with said expansion member.

4. The tool as set forth in claim 3 further comprising an air hose operatively connected with said expansion member.

5. The tool as set forth in claim 3 in which said expansion member comprises an inner bladder and an outer covering.

6. The tool as set forth in claim 5 in which said expansion member operates pneumatically.

7. A tool for adjusting camber of a vehicle wheel adjacent a strut when the tool is used with a source of compressed air, said tool comprising:

an expansion member having an inner bladder and an outer covering, said inner bladder and outer covering fabricated from a durable material capable of holding pressurized air to a degree whereby the camber of the vehicle wheel may be adjusted by selectively pressurizing the expansion member with fluid from said source of pressurized fluid;

said expansion member positionable between said vehicle wheel and said strut and adapted to expand in response to compressed air supplied from the compressed air source;

an air inlet port attached to said inner bladder and extending through said outer covering;

an air hose connected to said air inlet port and adapted to connect to the source of compressed air;

a lever-operated air supply valve operatively connected with said air hose between said air inlet port and the source of compressed air;

an air release valve operatively connected with said air hose between said air inlet port and said air supply valve;

said air release valve operable manually; and said air release valve also operable automatically in response to excessive air pressure in said expansion member.

8. The tool as set forth in claim 7, further comprising a three-way block formed with three apertures in fluid communication with one another, said air supply valve, said air release valve, and said air hose operatively attached to said three-way block.

9. The tool as set forth in claim 7 in which said outer covering includes a selectively openable opening sized to allow said inner bladder to be installed into and removed from said outer covering.

10. A tool for adjusting vehicle wheel camber when used with a source of pressurized fluid, said tool comprising:

an expansion member, said expansion member adapted to expand when fluid is supplied to said expansion member from the source of pressurized fluid;

said expansion member fabricated from a durable material capable of holding fluid pressurized to a degree whereby the camber of the vehicle wheel may be adjusted with the expansion member;

a fluid supply valve operatively connected with said expansion member;

a fluid release valve operatively connected with said expansion member;

a fluid hose operatively connected with said expansion member; and a three-way block formed with three apertures in fluid communication with one another, said air supply valve, said air release valve, and said fluid hose operatively attached to said three-way block.

11. The tool as set forth in claim 10 in which said expansion member comprises an inner bladder and an outer covering.

12. The tool as set forth in claim 11 in which said outer covering includes a selectively openable opening sized to allow said inner bladder to be installed into and removed from said outer covering.

13. The tool as set forth in claim 10 in which said expansion member operates pneumatically.

14. The tool as set forth in claim 10 in which said vehicle wheel which is adjacent a strut and the expansion member is positionable between said vehicle wheel and said strut.

15. The tool as set forth in claim 14 in which the camber of the vehicle may be adjusted by expanding the expansion member by providing fluid from said source of pressurized fluid to the expansion member.

16. A tool for adjusting vehicle wheel camber when the tool is used with a source of compressed air, said tool comprising:

an expansion member having an inner bladder and an outer covering, said inner bladder and outer covering fabricated from a durable material capable of holding pressurized air to a degree whereby the camber of the vehicle wheel may be adjusted with the expansion member;

said expansion member adapted to expand in response to compressed air supplied from the compressed air source;

an air inlet port attached to said inner bladder and extending through said outer covering;

an air hose connected to said air inlet port and adapted to connect to the source of compressed air;

a lever-operated air supply valve operatively connected with said air hose between said air inlet port and the source of compressed air;

an air release valve operatively connected with said air hose between said air inlet port and said air supply valve;

said air release valve operable manually;

said air release valve also operable automatically in response to excessive air pressure in said expansion member; and a three-way block formed with three apertures in fluid communication with one another, said air supply valve, said air release valve, and said air hose operatively attached to said three-way block.

17. The tool as set forth in claim 16 in which said outer covering includes a selectively openable opening sized to allow said inner bladder to be installed into and removed from said outer covering.

18. The tool as set forth in claim 16 in which said vehicle wheel is adjacent a strut and the expansion member is positionable between said vehicle wheel and said strut.

19. The tool as set forth in claim 18 in which said vehicle wheel is adjacent a strut and the expansion member is positionable between said vehicle wheel and said strut.

20. A tool for adjusting vehicle wheel camber when used with a source of pressurized fluid, said tool comprising:

an expansion member comprising an inner bladder and an outer covering, said expansion member adapted to expand when fluid is supplied to said expansion member from the source of pressurized fluid;

said expansion member fabricated from a durable material capable of holding fluid pressurized to a degree whereby the camber of the vehicle wheel may be adjusted with the expansion member;

a fluid supply valve operatively connected with said expansion member;

a fluid release valve operatively connected with said expansion member;

a fluid hose operatively connected with said expansion member; and said outer covering of the expansion member including a selectively openable opening sized to allow said inner bladder to be installed into and removed from said outer covering.

21. The tool as set forth in claim 20, further comprising a three-way block formed with three apertures in fluid communication with one another, said air supply valve, said air release valve, and said air hose operatively attached to said three-way block.

22. The tool as set forth in claim 20 in which said expansion member operates pneumatically.

23. The tool as set forth in claim 20 in which said vehicle wheel is adjacent a strut and the expansion member is positionable between said vehicle wheel and said strut.

24. The tool as set forth in claim 23 in which the camber of the vehicle may be adjusted by expanding the expansion member by providing fluid from said source of pressurized fluid to the expansion member.

25. A tool for adjusting vehicle wheel camber when the tool is used with a source of compressed air, said tool comprising:

an expansion member having an inner bladder and an outer covering, said inner bladder and outer covering fabricated from a durable material capable of holding pressurized air to a degree whereby the camber of the vehicle wheel may be adjusted with the expansion member;

said expansion member adapted to expand in response to compressed air supplied from the compressed air source;

an air inlet port attached to said inner bladder and extending through said outer covering;

an air hose connected to said air inlet port and adapted to connect to the source of compressed air;

a lever-operated air supply valve operatively connected with said air hose between said air inlet port and the source of compressed air;

an air release valve operatively connected with said air hose between said air inlet port and said air supply valve;

said air release valve operable manually;

said air release valve also operable automatically in response to excessive air pressure in said expansion member; and said outer covering includes a selectively openable opening sized to allow said inner bladder to be installed into and removed from said outer covering.

26. The tool as set forth in claim 25 in which a three-way block formed with three apertures in fluid communication with one another, said air supply valve, said air release valve, and said air hose operatively attached to said three-way block.

27. The tool as set forth in claim 25 in which said vehicle wheel is adjacent a strut and the expansion member is positionable between said vehicle wheel and said strut.

28. The tool as set forth in claim 27 in which said vehicle wheel is adjacent a strut and the expansion member is positionable between said vehicle wheel and said strut.

29. A tool for adjusting camber of a vehicle wheel when used with a source of pressurized fluid, said tool comprising:

an expansion member, said expansion member positionable adjacent said vehicle wheel and said strut adapted to expand when fluid is supplied to said expansion member from the source of pressurized fluid; and said expansion member fabricated from a durable material capable of holding pressurized fluid whereby the camber of the vehicle wheel may be adjusted by selectively pressurizing the expansion member with fluid from said source of pressurized fluid.

* * * * *